(12) United States Patent  
Bhagavatula

(10) Patent No.: US 6,259,841 B1  
(45) Date of Patent: Jul. 10, 2001

(54) REFLECTIVE COUPLING ARRAY FOR OPTICAL WAVEGUIDE

(75) Inventor: Venkata Adiseshaiah Bhagavatula, Big Flats, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/331,628

(22) PCT Filed: Dec. 4, 1997

(86) PCT No.: PCT/US97/23062

§ 371 Date: Jun. 18, 1999

§ 102(e) Date: Jun. 18, 1999

(87) PCT Pub. No.: WO98/30925

PCT Pub. Date: Jul. 16, 1998

Related U.S. Application Data

(60) Provisional application No. 60/033,696, filed on Dec. 20, 1996.

(51) Int. Cl.[7] .............................. G02B 6/26; H04J 14/02; G03G 15/00
(52) U.S. Cl. ................... 385/47; 385/31; 385/36; 385/37; 385/49; 385/52; 385/129; 385/130; 385/131; 359/124; 359/127; 359/130; 430/56; 430/57; 430/127
(58) Field of Search .................... 385/14, 15, 31, 385/36, 37, 47, 49, 52, 129, 130, 131; 65/385, 386; 430/56, 57, 127; 359/115, 124, 130, 127

(56) References Cited

U.S. PATENT DOCUMENTS

| | | | |
|---|---|---|---|
| 4,583,820 | * | 4/1986 | Flamand et al. ................ 385/47 X |
| 4,652,080 | * | 3/1987 | Carter et al. .................... 385/47 X |
| 4,714,313 | * | 12/1987 | Kapany et al. ................. 385/47 X |
| 4,735,677 | * | 4/1988 | Kawachi et al. ................. 156/633 |
| 4,750,799 | * | 6/1988 | Kawachi et al. ............... 385/14 X |
| 5,182,787 | * | 1/1993 | Blonder et al. ................... 385/131 |
| 5,600,741 | * | 2/1997 | Hauer et al. ........................ 385/35 |
| 5,999,670 | * | 12/1999 | Yoshimura et al. ............... 385/31 |
| 5,999,672 | * | 12/1999 | Hunter et al. ..................... 385/37 |
| 6,011,884 | * | 1/2000 | Dueck et al. ...................... 385/24 |
| 6,108,471 | * | 8/2000 | Zhang et al. ...................... 385/37 |

FOREIGN PATENT DOCUMENTS

| | | | | |
|---|---|---|---|---|
| 0121812 A2 | * | 3/1983 | (EP) | ................... 385/31 X |
| 0093396 A2 | * | 11/1983 | (EP) | ................... 385/37 X |
| 0173930 A2 | * | 3/1986 | (EP) | ................... 385/31 X |
| 0196948 A1 | * | 10/1986 | (EP) | ................... 385/37 X |
| 0256809 A2 | * | 2/1988 | (EP) | ................... 385/31 X |
| 0256809 A3 | * | 2/1988 | (EP) | ................... 385/31 X |

* cited by examiner

*Primary Examiner*—Brian Healy  
(74) *Attorney, Agent, or Firm*—William Greener; Thomas Ryan; Juliana Agon

(57) ABSTRACT

A coupling for an optical device that disperses wavelengths along a focal line includes reflective surfaces that fold light out of a plane propagation and into alignment with an array of inputs or outputs. Some of the reflective surfaces are offset from the focal line so that the inputs or outputs can be spaced closer together in a dimension along the focal line.

66 Claims, 9 Drawing Sheets

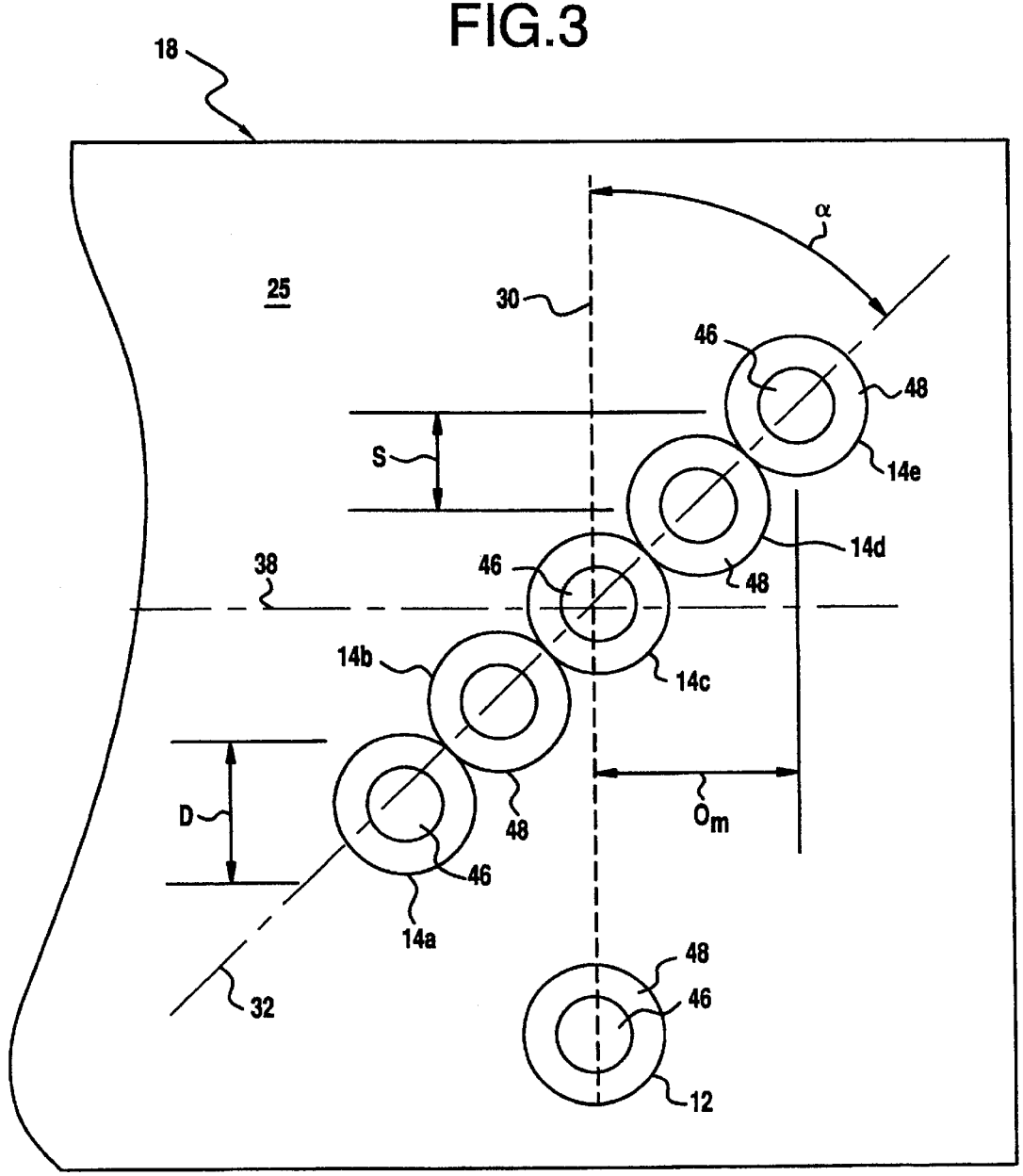

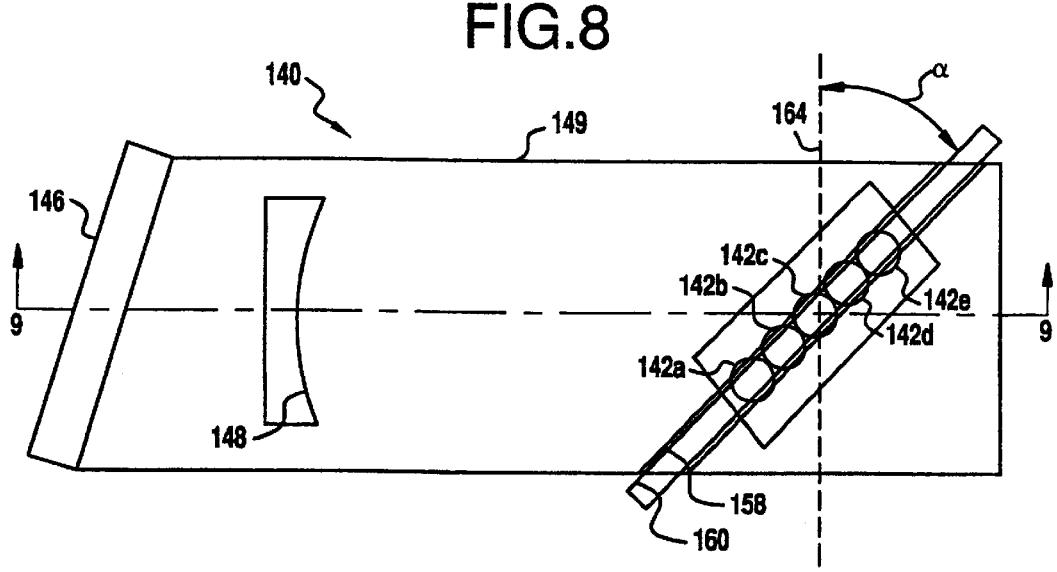
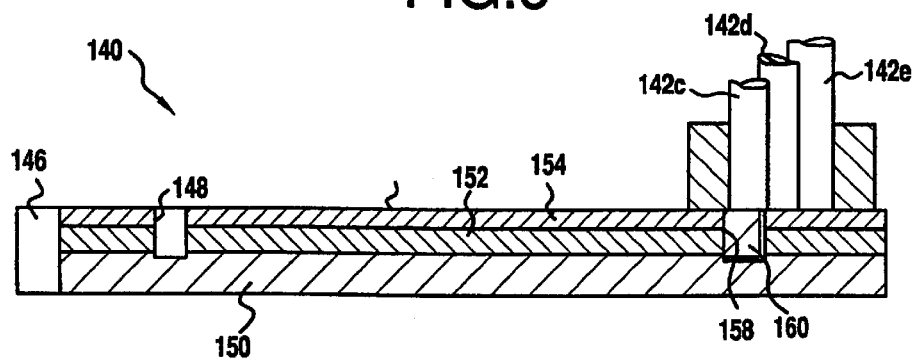
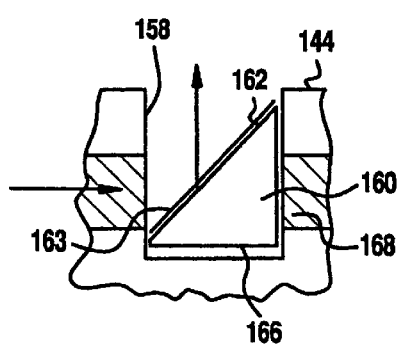
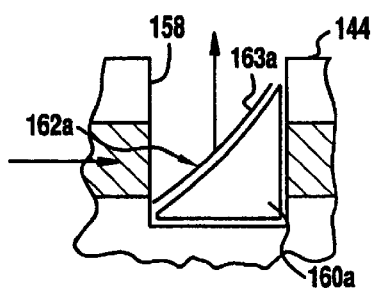
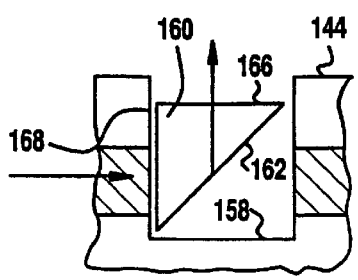

REFLECTIVE COUPLING ARRAY FOR OPTICAL WAVEGUIDE

This application is a 371 of PCT/US97/23062 filed Dec. 4, 1997 and claims the benefit of Provisional No. 60/033,696 filed Dec. 20, 1996.

TECHNICAL FIELD

The invention makes a contribution to the field of optical communications, especially to couplings with optical devices that separate the wavelengths.

BACKGROUND

Inputs and outputs are generally coupled to ends of planar waveguides in alignment with a direction of light propagation through the waveguides. For example, optical fiber inputs and outputs are generally coupled by aligning a core layer of each fiber with a core layer of the planar waveguide. Cladding layers surrounding the fiber cores separate the cores along the ends of the waveguides. The number of fibers that can be coupled to an end of a waveguide is limited by the diameters of the fibers.

Despite the further miniaturization of features within planar waveguides, waveguide dimensions are often significantly increased to provide sufficient room for coupling the input and output fibers. Fiber diameters, which typically measure around 125 microns, can be reduced to only about 70 to 75 microns without significantly deteriorating in structure or function. Similar problems are apparent with other types of inputs and outputs such as laser light sources and photodetectors—each of which is generally larger in transverse dimension (e.g., diameter) than optical fibers.

This problem is particularly apparent in planar waveguide multiplexer/demultiplexer devices that route optical signals between individual and common inputs or outputs (e.g., optical fibers). Within many of these planar waveguides, a dispersing mechanism, such as a diffraction grating, angularly distinguishes different wavelength signals and a focusing mechanism, such as a lens, converts the angularly distinguished signals into spatially distinguished signals. An array of inputs or outputs is aligned with the spatially distinguished signals along an end of the planar waveguide.

Even a tight grouping of the inputs or outputs requires a much larger planar waveguide than would otherwise be required to accomplish its function. Either the dispersing and focusing mechanisms must be increased in size to spatially separate the signals to match the spacing between the inputs or outputs or an intermediate coupling must be added to otherwise expand the signal separation to match the input or output spacing. The intermediate coupling adds length to the planar waveguide and reduces coupling efficiencies.

Planar waveguides have also been coupled to each other and to external devices, such as lasers and photodetectors, using out-of-plane mirrors that reflect light normal to the direction of light propagation through the planar waveguides. For example, U.S. Pat. No. 4,750,799 to Kawachi et al. mounts a micro-reflecting mirror between guides of a planar waveguide for folding light through a right angle to an external device mounted on top of the planar waveguide. The micro-reflecting mirror is separately manufactured from coated glass or plastic and is mounted between the guides so that the mirror's reflective surface is oriented at 45 degrees to the direction of light propagation.

U.S. Pat. No. 5,182,787 to Blonder et al. and U.S. Pat. No. 5,263,111 to Nurse et al. teach the fabrication of similar out-of-plane mirrors as integral structures of planar waveguides. Both involve etching cavities in planar waveguides and coating an inclined side wall of the cavity with a reflective material. Blonder et al. etch the opposite side wall nearly perpendicular to minimize refraction of light emitted into the cavity. Nurse et al. coat portions of a cavity floor and shelf in addition to an inclined side wall for improving uniformity of the reflective surface.

However, none of the proposed arrangements for coupling external devices or other planar waveguides to top or bottom surfaces of planar waveguides entail any suggestions for reducing spacing requirements of multiple inputs or outputs.

SUMMARY OF INVENTION

My invention is particularly useful for reducing dimensions of optical devices that involve coupling signals or signal portions distinguished by wavelength. Without changing the outer dimensions of inputs or outputs to such devices, the inputs or outputs are effectively positioned closer together to reduce requirements for spatial dispersion of the wavelengths within the devices.

The same coupling elements can often function as either inputs or outputs depending on the direction of light travel through optical devices. Since my invention is concerned with improving multiple wavelength couplings regardless of the direction of light travel, the term "input/output" is used to refer to such elements that might function as inputs, outputs, or both.

One example of my invention includes a wavelength separator within a waveguide for directing different wavelengths through separate foci along a focal line that lies in a plane of propagation through the waveguide. Reflective surfaces also located within the waveguide fold the wavelengths out of the plane of propagation and into alignment with an array of input/outputs. At least some of the reflective surfaces are offset from the focal line so that the input/outputs can be spaced closer together in a dimension along the focal line.

Preferably the reflective surfaces are located along a centerline that intersects the focal line at an angle. The input/outputs are arranged along a corresponding centerline and can be mounted as a group on a surface of the waveguide. The spacing between the input/outputs along the centerline is limited by the outer dimensions of the input/outputs, but their effective spacing along the focal line is reduced by a factor of the cosine of the angle between the centerline and the focal line.

The focal depth through which the different wavelengths are focused is preferably at least as large as the amount the reflective surfaces are offset from the focal line—so the offset has little effect on mode field dimensions of the focused wavelengths or on the resulting coupling efficiencies. However, larger offsets can be accommodated by shaping the reflective surfaces to refocus the wavelengths within desired dimensions. Also, each of the reflective surfaces can be individually inclined to their common centerline to enhance coupling efficiencies.

The reflective surfaces can be made in a variety of ways, including variations for accommodating integrated, hybrid, and bulk designs. For example, the reflective surfaces can be integrated within a planar waveguide by etching a cavity having side walls inclined through a common angle with the plane of propagation. The cavity can be left empty for supporting total internal reflection from one of the inclined side walls, or the other of the side walls can be coated with a reflective surface and the cavity can be filled with an index-matching material for supporting external reflections from the coated side wall.

A more conventional cavity can also be formed in a planar waveguide and filled with a different material for forming the reflective surface. For example, the cavity can be filled with an organic material that can be ablated by ultraviolet irradiation, leaving an inclined surface. A photosensitive material can also be used to fill the cavity. Selective exposure of the photosensitive material and subsequent development can be used to produce a similar inclined surface. Other photosensitive material together with interfering light beams can be used to produce a holographic grating within the cavity composed of a plurality of partially reflective surfaces. The holographic grating functions as an interference filter having a pass band that reflects the desired wavelengths.

The reflective surfaces can also be separately formed as one or more reflective optics and inserted into cavities or troughs formed in planar waveguides. For example, a thin optical fiber having triangular cross section can be mounted in a trough formed in the waveguide. One of the side surfaces of the fiber can be coated to form a continuous reflective surface oriented for folding wavelengths out of the plane of propagation and into alignment with respective input/outputs. A similar fiber could also be mounted to provide total internal reflection between the propagating plane and the array of input/outputs.

In most instances, the input/outputs are expected to be optical fibers, and the reflective surfaces could be formed on the inner ends of these fibers. For example, the inner ends of the input/output fibers can be cut to a 45 degree angle and coated with a reflective surface. A common mounting block supports the angled ends of the fibers with respect to a wavelength separator for reducing the required spatial separation between wavelengths along a focal line of the separator.

DRAWINGS

FIG. 3 is an enlarged broken-away top view of the demultiplexer showing various relationships among input and output fibers extending normal to the view.

FIG. 8 is a schematic plan view of an alternative hybrid demultiplexer arranged in accordance with my invention.

FIG. 9 is a cross-sectional view of the alternative demultiplexer along line 9—9 of FIG. 8.

FIGS. 10A–10C are enlarged broken-away views along a trough formed in a planar waveguide of the alternative demultiplexer for supporting optical fibers having triangular cross sections.

DETAILED DESCRIPTION

Figure 1:
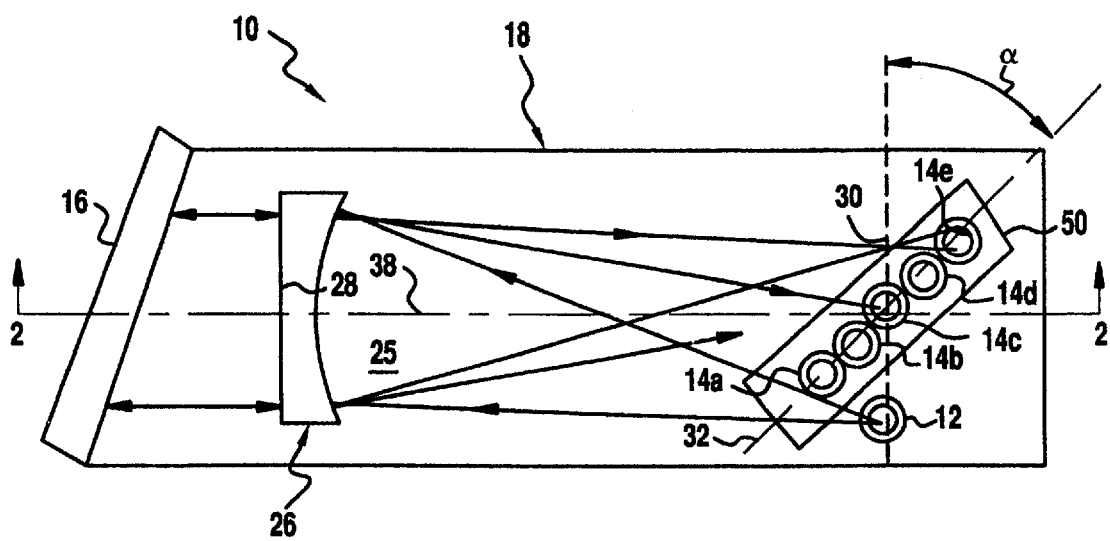
FIG. 1 is a schematic plan view of a hybrid demultiplexer arranged in accordance with my invention.

A first embodiment of my invention as a wavelength demultiplexer 10 is depicted by FIGS. 1–4. The same device could also be regarded as a multiplexer simply by reversing the direction of light travel between an input optical fiber 12 and an array of output optical fibers 14a–14e. In this example, the input fiber 12 conveys a plurality of different wavelength signals, also referred to as channels, to the demultiplexer; and each of the output fibers 14a–14e conveys one of the different wavelength signals from the demultiplexer 10.

The demultiplexer 10 is constructed as a hybrid optical device having a reflective diffraction grating 16 bonded to one end of a planar waveguide 18 containing the remaining components of the device. The diffraction grating 16 includes reflective features that can be more conveniently formed in a separate optical element. For example, the features of diffraction grating 16 can be mechanically etched, embossed, or replicated or can be formed using photolithographic exposures normal to its surface.

The planar waveguide 18 has a substrate 20 on which successive layers of core 22 and overcladding 24 are deposited. In this example, the substrate 20 functions as an undercladding. However, a separate undercladding layer could also be deposited between the substrate 20 and the core layer 22. As usual, the core layer 22 has a higher refractive index than the surrounding substrate 20 and overcladding layer 24 for confining light within a plane of propagation 25 through the planar waveguide 18. The thickness of the core layer 22 can be controlled to limit multimode transmissions.

A planar lens 26 is formed as an air cavity 28 within the planar waveguide 18. The illustrated lens 26 is etched all the way through the core and overcladding layers 22 and 24. However, a similar lens could be formed by etching only through the overcladding layer 24 so that it behaves as a dielectric loaded section. The cavity 28 could also be filled with a high-index material and appropriately changed in shape to preserve desired focusing qualities.

The diffraction grating 16 and planar lens 26 function together as a wavelength separator. The diffraction grating 16 angularly disperses the different wavelength signals injected by the input fiber 12, and the planar lens 26 spatially distinguishes the different wave length signals by focusing each of the angularly dispersed signals at a different position along a focal line 30. More specifically, the planar lens 26 first functions as a collimator for converting the signals from a set of spherical wavefronts emanating from an apparent point source (the input fiber 12) into a set of parallel planar wavefronts. The diffraction grating 16 returns a set of planar wavefronts that are relatively inclined according to their wavelength. The planar lens 26 then focuses each wavelength approaching at a unique angle to a different position along the focal line 30.

Much of the overall sizing of the diffractive optic 16 and the lens 26 is determined by a required spacing "S" between wavelength signals along the focal line 30, which in this embodiment is reduced to less than an outer diameter "D" of the output fibers 14a–14e. The reduction is made possible by two changes from the conventional orientations of the output fibers 14a–14e. First, output fibers 14a–14e extend out of the plane of propagation 25, preferably normal to the plane of propagation. Second, inner ends of the output fibers 14a–14e are arranged in a row along a centerline 32 that is inclined in the plane of propagation 25 through an angle "α" with respect to the focal line 30. The required spacing "S" between different wavelength signals is reduced with respect to the diameter "D" according to the following mathematical expression:

$$S = D \cos \alpha$$

Thus, the reduction in the spacing "S" is only a function of the inclination angle "α" in the plane of propagation 25. The extension of the output fibers 14a–14e out of the plane of propagation 25 makes this angular change possible. However, to reach the output fibers 14a–14e from the plane of propagation 25, the signals must be folded out of the plane of propagation and into alignment with the new orientation of the output fibers 14a–14e.

This is accomplished by an array of output reflective surfaces 34a–34e that are formed in respective cavities 36a–36e within the planar waveguide 18. Similar to the output fibers 14a–14e, the output reflective surfaces 34a–34e are arranged in a row along the centerline 32. However, each of the output reflective surfaces 34a–34e is also inclined to the plane of propagation 25 through an approximately 45 degree angle and is preferably inclined in the plane of propagation 25 through a variable angle "β" with respect to the centerline 32. The magnitude of the angle "β" varies with distance from an optical axis 38 of the planar lens 26 so that the reflective surfaces 34a–34e face a center 40 of the lens 26.

An input reflective surface 42 is similarly formed in a cavity 44 of the planar waveguide 18 for coupling the input fiber 12 to the planar waveguide 18. The input fiber 12 extends parallel to the output fibers 14a–14e. The input reflective surface 42 is inclined to the plane of propagation 25 through an approximately 45 degree angle with the plane of propagation 25 and is centered on the focal line 30.

Only the reflective surface 34c of the output reflective surfaces 34a–34e is located along the focal line 30. All of the other output reflective surfaces 34a, 34b, 34d, and 34e are offset by various amounts from the focal line 30 in the direction of the optical axis 38. Preferably, a maximum amount of offset "$O_m$" is within the depth of focus of the planar lens 26 so that only a small change in the mode field radii of the different wavelength signals occurs through the offset distance. Also, the dimensions of the cavities 36a–36e and 44 are preferably kept as small as possible to limit the length of travel between the planar waveguide 18 and the optical fibers 14a–14e and 12 through which further signal divergence can take place.

The depth of focus is increased for a given focal length by minimizing the numerical aperture of the planar lens 26, which must be large enough to collect substantially all of the light emitted by the input fiber 12. A numerical aperture of the fibers 12 and 14a–14e can be adjusted by controlling an index difference between core and cladding layers 46 and 48 of the fibers 12 and 14a–14e. Increasing the size of the core layer 46 relative to the cladding layer 48 at the fiber ends can also be used to improve transmission efficiency. Signal divergence can be further controlled by using the reflective surfaces as secondary focusing optics. For example, the reflective surfaces 34a–34e and 42 could be formed as concave surfaces to refocus the signals.

Figure 2:
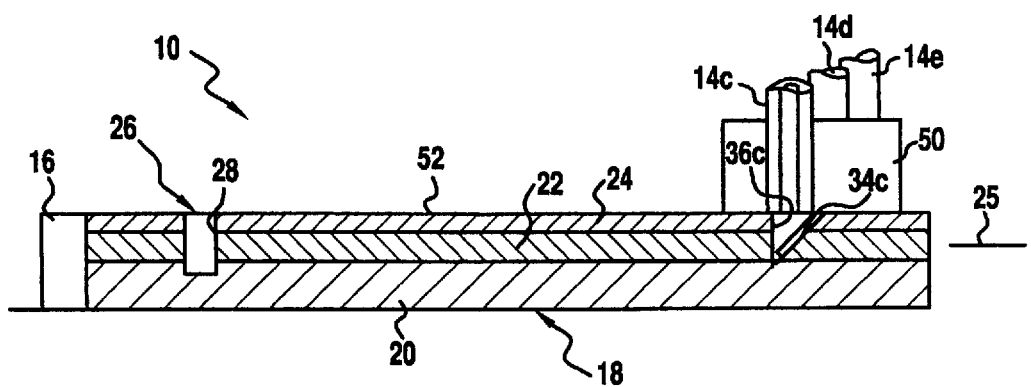
FIG. 2 is a cross-sectional view of the demultiplexer along line 2—2 of FIG. 1.
Figure 2A:
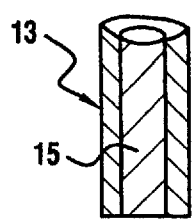
FIGS. 2A–2B are enlarged cross-sectional views of two alternative fibers that can be coupled to the demultiplexer of FIGS. 1 and 2.
Figure 2B:
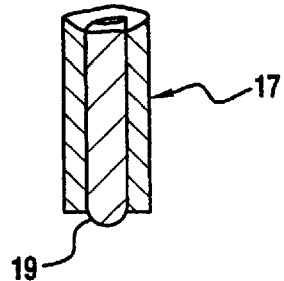
Figure 4:
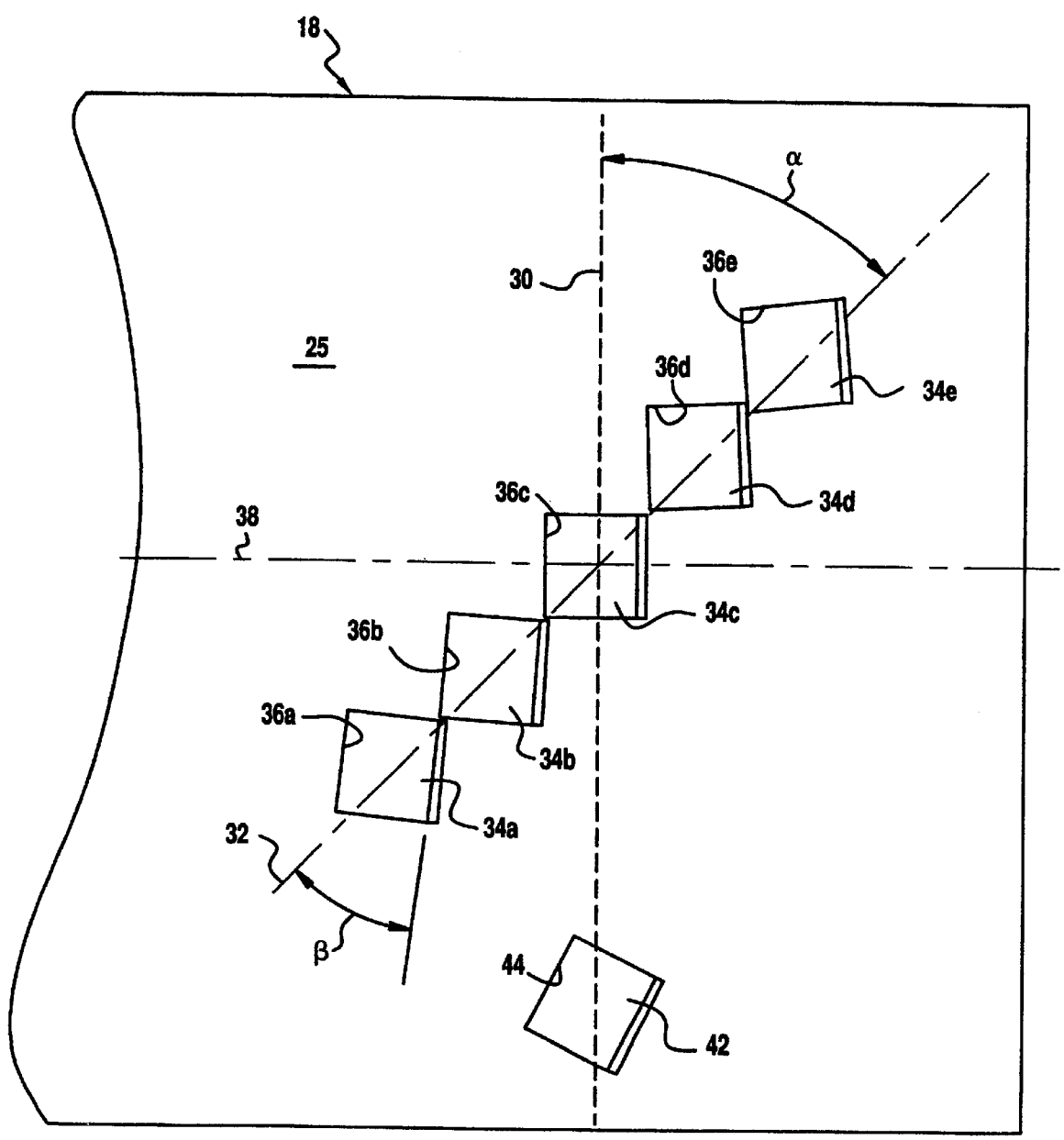
FIG. 4 is a view similar to FIG. 3 but with the input and output fibers removed to reveal an array of reflectors embedded in a planar waveguide.

The inner ends of the fibers 12 and 14a–14e can also be modified to provide focusing qualities to control signal divergence. Two examples are depicted in FIGS. 2A and 2B. Fiber 13 of FIG. 2A terminates with a fiber GRIN (graded index) lens 15, which is adjusted in length to provide the desired focusing qualities. Generally, the length of the fiber GRIN lens 15 is approximately one-quarter pitch but is preferably a little longer to focus diverging light within the fiber 13. More information concerning the design of fiber GRIN lenses is disclosed in an article entitled "Analysis and Evaluation of Graded-index Fiber-Lenses" by William L. Emkey et al., published in the Journal of Lightwave Technology, Vol. LT-5, No. 9, September 1987, and which is hereby incorporated by reference.

Fiber 17 of FIG. 2B terminates with a microlens 19 to provide similar focusing qualities. Preferably, the microlens 19, which is convex shaped, is formed at the end of the fiber 17 by etching. Further details of a chemical-etching/fire-polishing technique for forming such lenses is disclosed in an article entitled "Microlens Formation on VAD Single-Mode Fibre Ends" by M. Kawachi et al., published in Electronics Letters, Vol. 18, Jan. 21, 1982, pages 71–72, and which is hereby incorporated by reference.

Returning to FIGS. 1 and 2, the inner ends of the output fibers 14a–14e are preferably aligned within a common mounting block 50 that is attached to a surface 52 of the planar waveguide 18. The block 50 can be attached using a variety of well-known means including laser welding, gluing with epoxy, or frit sealing to the planar waveguide 18. Such blocks themselves, which may include V-shaped grooves for confining fibers, are well known for mounting fibers in conventional orientations.

The demultiplexer 10 could also be configured in a variety of different ways involving similar size reductions. For example, the input fiber 12 could be mounted in a more conventional manner aligned with the plane of propagation 25 or in alignment with the output fibers 14a–14e within the same mounting block 50. The output fibers 14a–14e could also be relatively offset from the focal line 30 in a variety of patterns such as following a curved line or zigzag. In a staggered pattern, all of the output fibers could be minimally offset through the same distance from the focal line. The diffraction grating 16 could be alternatively formed as an integrated structure within the planar waveguide 18 and could be curved in the plane of propagation 25 to also perform some or all of the focusing functions of the planar lens 26.

Figure 5A:
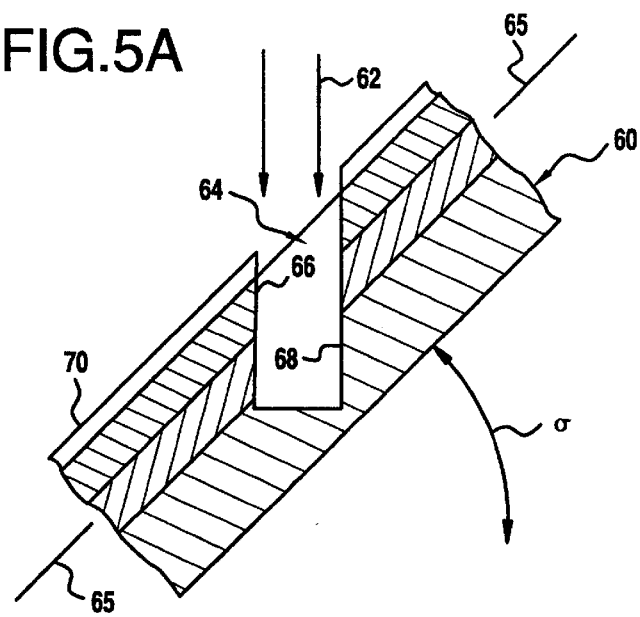
FIGS. 5A–5C are enlarged broken-away cross-sectional views of a similar planar waveguide showing two versions of a reflective surface formed on opposite side walls of an etched cavity.

FIGS. 5A–7D illustrate a variety of ways of integrating out-of-plane reflective surfaces in similar planar waveguides. In FIG. 5A, a planar waveguide 60 is inclined from a normal to a directed beam 62 through an angle "σ" for forming a cavity 64 having opposing side walls 66 and 68 that are similarly inclined to a plane of propagation 65. The beam 62, which can be formed from an ionized plasma, can be directed between two electrodes (not shown) for forming the cavity 64 by reactive ion etching. A removable material 70, such as chrome, masks remaining portions of the planar waveguide 60 from the directed beam 62.

Figure 5B:
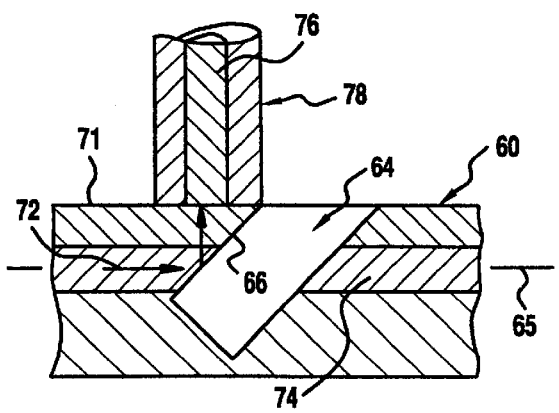

Either of the opposing side walls 66 and 68 can be used to orient a reflective surface. In FIG. 5B, the cavity 64 remains empty and the side wall 66 forms a boundary surface that functions as a reflective surface by "total internal reflection". The side wall 66 undercuts a top surface 71 of the waveguide 60 through a sufficient angle "σ" so that signals 72 traveling along a core layer 74 of the waveguide reflect out of the plane of propagation 65 and into alignment with a core layer 76 of an optical fiber 78 extending normal to the plane of propagation 65.

Figure 5C:
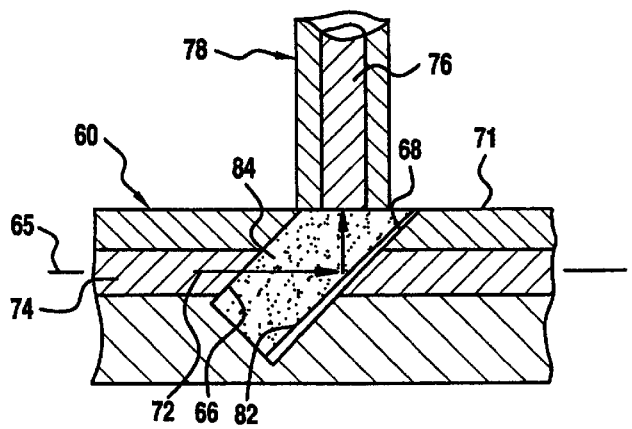
Figure 6A:
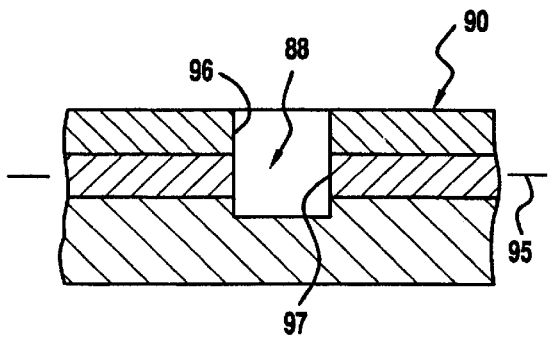
FIGS. 6A–6D are similar broken-away views of another planar waveguide having a more conventional cavity filled with a material that is further processed to form a reflective surface.
Figure 6B:
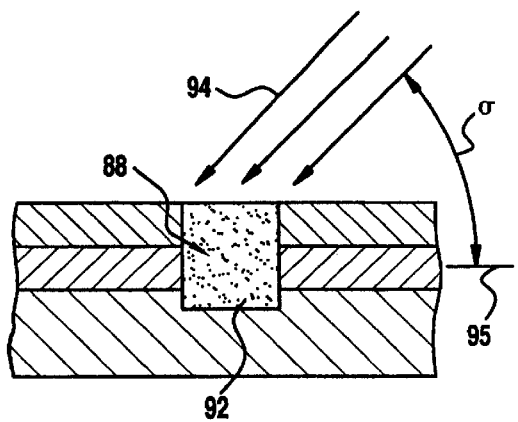
Figure 6C:
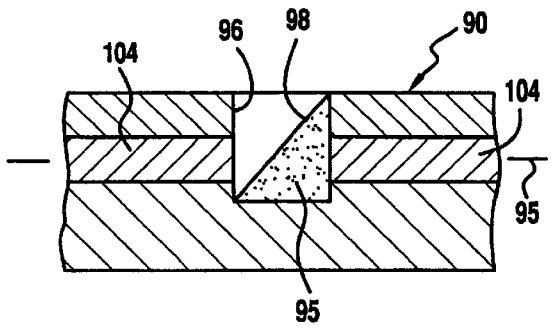
Figure 6D:
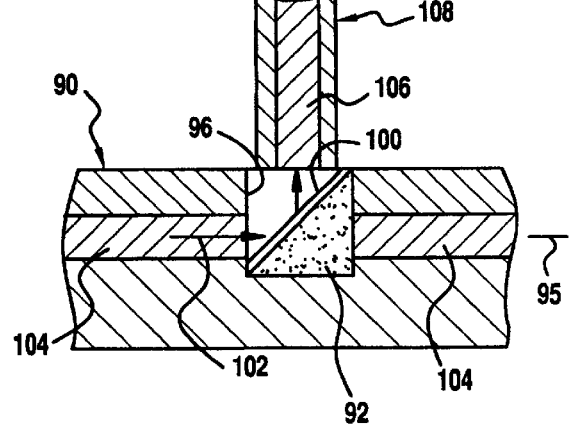
Figure 7A:
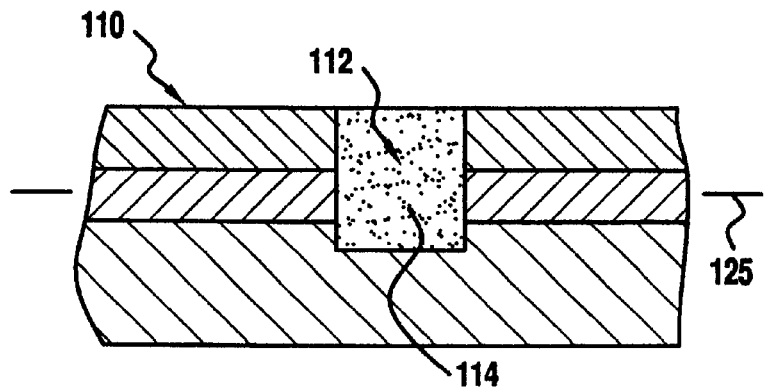
FIGS. 7A–7C are similar views of a planar waveguide having a cavity filled with a volume grating.
Figure 7B:
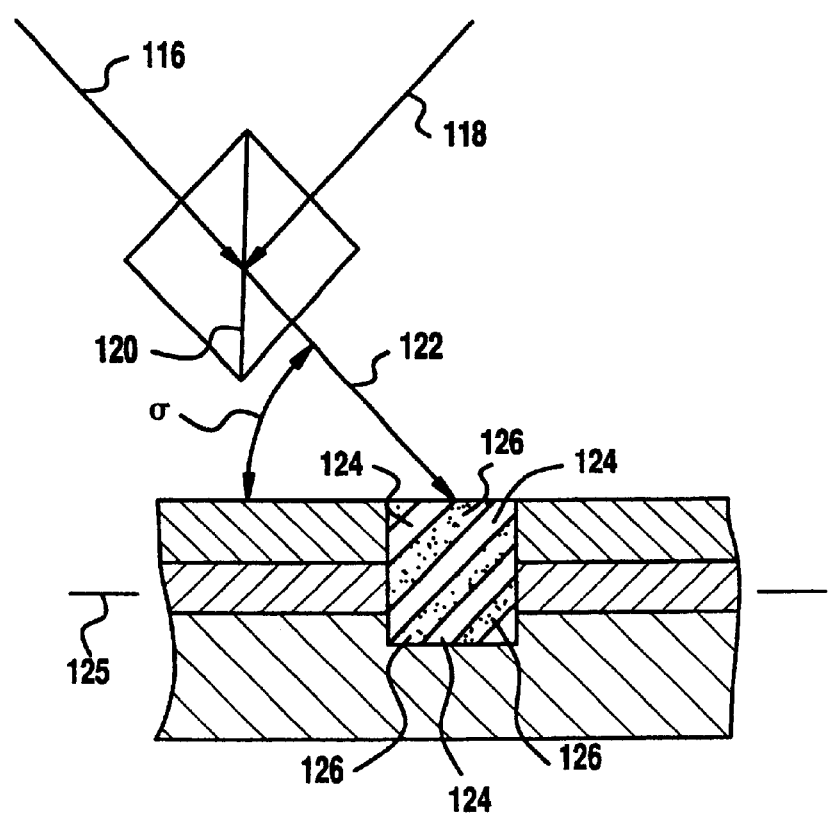
Figure 7C:
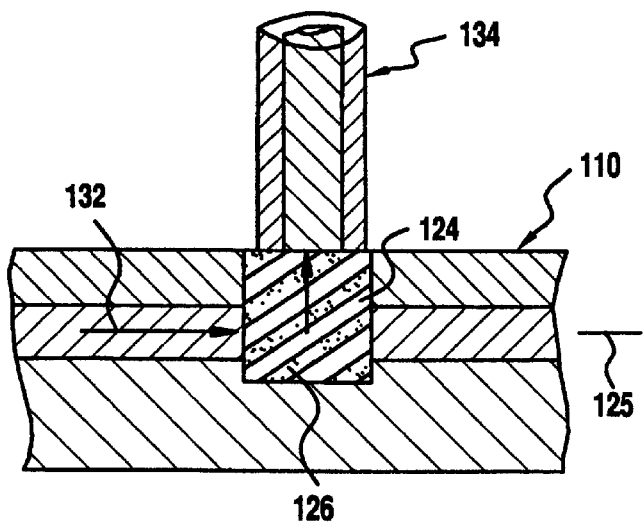
Figure 7D:
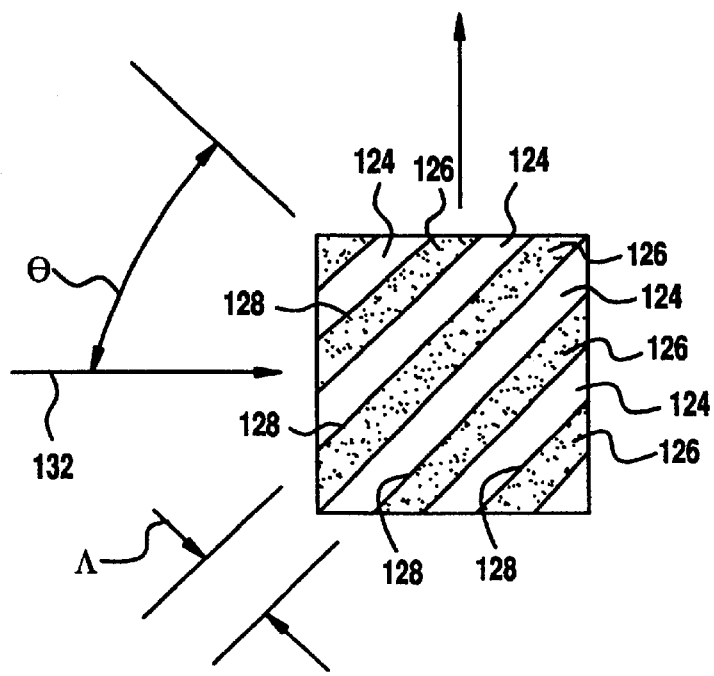
FIG. 7D is a further enlarged view of the grating.

In FIG. 5C, the side wall 68 is coated with a reflective covering for functioning as a reflective surface. An index-matching material 84 (such as an epoxy) is used to fill the remaining cavity 64 to prevent reflections from the side wall 66 caused by index differences between the core layer 74 and the cavity 64. The fiber 78 is moved so that its core layer 76 is in communication with the core layer 74 of the planar waveguide through the reflective coating 82 on the side wall 68. A spacing between the side walls 66 and 68 is preferably as small as possible (e.g., 10–30 microns) to limit a path length of the optical signals 72 through which divergence beyond the core layers 74 and 76 can take place.

In FIGS. 6A–D, a more conventional cavity 88 is formed in a planar waveguide 90 and filled with a material 92 that specially interacts with a directed beam 94 inclined through a similar angle "σ" with respect to a plane of propagation 95. The cavity 88, which includes opposite side walls 96 and 97, is preferably formed with a rectangular cross section so that the side wall 96 extends normal to the plane of propagation 95 to minimize unwanted reflections or refractions from its surface.

The directed beam interacts with the material 92 filling the cavity 88 to form an inclined surface 98 that can be subsequently coated with a reflective material 100 for forming an out-of-plane reflective surface. For example, the material 92 could be an organic material, such as an acrylate or polyimide; and the directed beam 94 could be a high intensity beam of ultraviolet light, such as produced by an excimer laser, for photoablating unwanted portions of the material 92 from the cavity 88. Other portions of the planar waveguide 90 are formed by different materials, such as glass or silicates, that do not ablate within the same energy regimes.

Alternatively, the material 92 could be a photosensitive material, such as a positive photoresist that is rendered soluble by exposure to light. Shipley 1400 series photoresists or other thick film photoresists are preferred. A developing solution removes the exposed areas of the material 92 leaving a similar inclined surface 98. Ultraviolet light can still be used to expose the material 92, but much lower energy densities are required than those used for photoablation.

Reflection from the coating 100 on the inclined surface 98 folds signals 102 out of the plane of propagation 95 within a core layer 104 of the planar waveguide 90 and into alignment with a core layer 106 of an optical fiber 108. Similar to the preceding embodiment, the cavity 88 is preferably as small as possible to limit dispersion of the signals 102; and an index-matching material (not shown) can be used to fill remaining portions of the cavity 88 for eliminating surface effects from the side wall 96.

In FIGS. 7A–D, a conventional cavity 112 in a planar waveguide 110 is also filled with a photosensitive material 114. However, the photosensitive material 114 of this embodiment reacts to light by changing its refractive index. Such materials are well known for producing holographic gratings.

Two beams 116 and 118 combine at a partially reflective surface 120 to produce an interference beam 122 in the form of a standing wave having a planar wavefront. The interference beam 122, which is also inclined at the angle "σ" to a plane of propagation 125, illuminates spaced planar sections 124 of the photosensitive material 114 for varying the refractive index of the illuminated planar sections 124 with respect to the remaining planar sections 126. The resulting alternating planar sections 124 and 126 of "high" and "low" refractive index form a volume grating 130 having a succession of partially reflective surfaces 128 that are spaced apart through a grating period "Λ". The volume grating 130, which can be used as an alternative to the mirror-like reflectors of the preceding embodiments, functions as a wide-band filter reflecting a desired band of signal wavelengths "λ".

The grating period "Λ" is related to signal wavelength "λ" as follows:

$$\Lambda = \frac{\lambda}{n_{eff} 2\sin\theta}$$

where "$n_{eff}$" is an effective index of refraction of the grating medium, and "θ" is an angle of incidence at which signals 132 traveling along the plane of propagation 125 strike the reflective surfaces 128 of the volume grating 130. The angle "θ" is also equal to the angle "σ" at which the interference beam 122 is inclined to the plane of propagation 125. With these angles equal to the preferred 45 degrees, the above expression for grating period "Λ" can be simplified as follows:

$$\Lambda = \frac{\lambda}{\sqrt{2}\, n_{eff}}$$

To achieve desired coupling efficiencies between the planar waveguide 110 and an optical fiber 134 extending out of the plane of propagation 125, the volume grating 130 preferably contains around 15 to 20 reflective surfaces 128 formed by the planar layers 124 and 126 varying in refractive index by about 0.1 to 0.2. More layers and larger differences between the "high" and "low" refractive indices can improve efficiencies. However, once again, the cavity 112 should be dimensioned as small as possible to limit wavelength dispersion between the planar waveguide 110 and the optical fiber 134.

Although the volume grating 130 is preferably manufactured in place within the cavity 112, the volume grating could also be made as a separate optic and subsequently inserted into place within the planar waveguide 110. Other types of gratings could also be used including planar gratings extending parallel to the plane of propagation 125.

FIGS. 8–10C illustrate another demultiplexer device 140 in which an array of input/output fibers 142a–142e is coupled normal to a planar waveguide 144. A reflective diffraction grating 146 is mounted at one end of the waveguide 144, and a planar lens 148 is integrated within the waveguide 144. In cross section, the waveguide 144 includes the usual layers of a substrate 150, a core 152, and an overcladding 154.

However, instead of forming individual cavities for mounting an array of reflective optics, a continuous trough 158 is formed in the waveguide for supporting an optical fiber 160 having a single reflective surface 162. Inner ends of the input/output fibers 142a–142e are located along the fiber 160 in positions for receiving different wavelength signals dispersed along a focal line 164 of the lens 148. The fiber 160 is inclined through an angle "α" with respect to the focal line 164 so that the inner ends of the fibers 142a–142e can be positioned closer together in a dimension along the focal line 164.

The trough 158, which can be etched or diced in the planar waveguide 144, has a rectangular cross section; and the fiber 160 has a triangular cross section. The reflective surface 162 is located on the hypotenuse of the triangular section and contains a reflective coating 163. Drawing or polishing can be used to smooth the reflective surface 162 prior to coating. The remaining right-angled sides 166 and 168 accurately orient the fiber 160 within the rectangular slot 158. An epoxy or glue can be used to secure the fiber 160 in place.

Instead of covering the reflective surface 162 with a reflective coating as shown in FIG. 10A, the fiber 160 could be rotated on its axis through 180 degrees as shown in FIG. 10B and remounted in the trough 158 to reflect signals by total internal reflection. Other cross-sectional shapes could also be used so long as one side of the fiber functions as the required reflective surface. Also, the fiber 160 could be mounted in an alternative slot having a longitudinally curved shape to more efficiently couple signals between the planar waveguide 144 and the input/output fibers 142a–142e.

An alternative optical fiber 160a, as shown in FIG. 10C, can be substituted to provide additional focusing qualities. A reflective surface 162a is formed with a curved cross section that is drawn into the fiber 160a and with a reflective coating 163a that is deposited onto the fiber 160a. Similar curvatures could be provided on the reflective surfaces of the other array embodiments.

Figure 11:
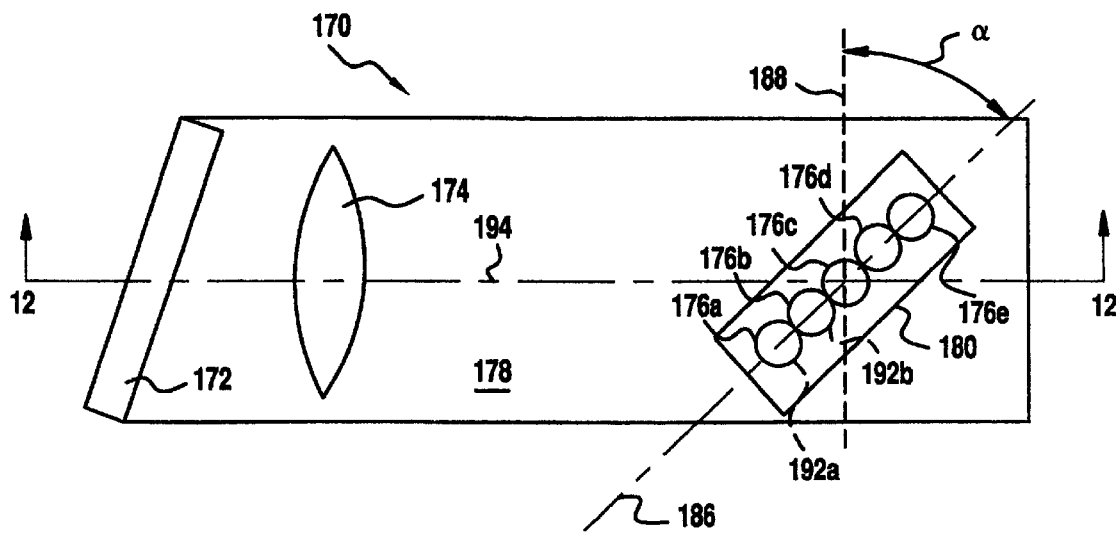
FIG. 11 is a schematic plan view of a bulk demultiplexer arranged in accordance with my invention.
Figure 12:
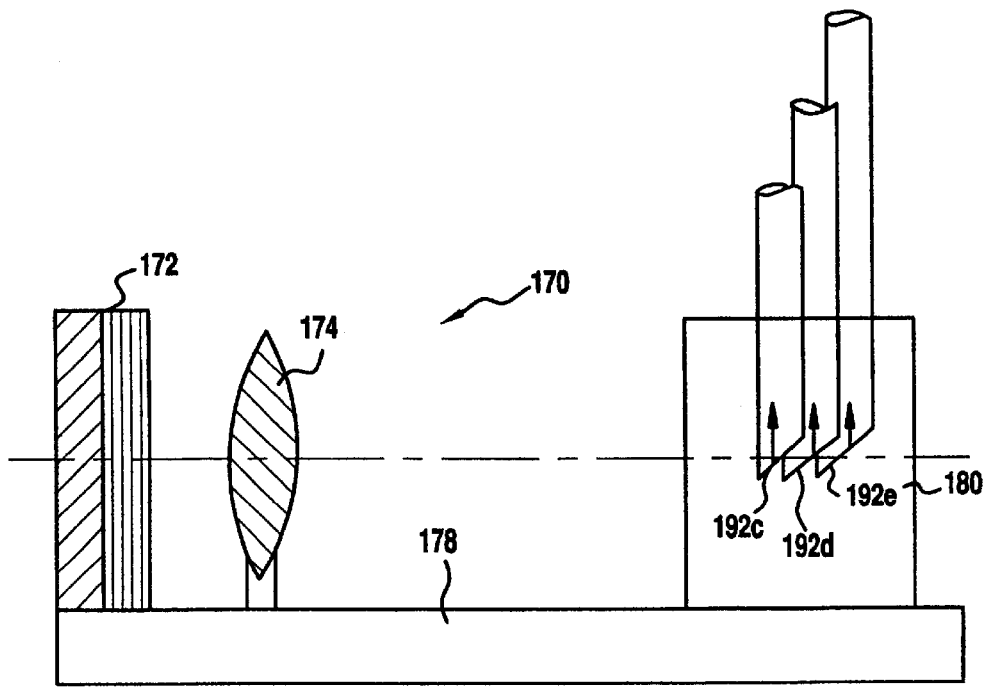
FIG. 12 is a cross-sectional view of the bulk demultiplexer along line 12—12 of FIG. 11.

Bulk optical devices, such as a bulk demultiplexer 170 depicted in FIGS. 11 and 12, can also benefit from my invention. A reflective grating 172, a collimating lens 174, and an array of input/output optical fibers 176a–176e are all mounted on a common support 178. An intermediate block 180 having a refractive index matching a cladding layer (not shown) of the fibers 176a–176e relatively aligns the fibers 176a–176e and mounts them on the common support 178.

Similar to the preceding embodiments, the fibers are located along a centerline 186 that is inclined through an angle "α" with respect to a focal line 188 of the collimating lens 174. However, instead of using separate reflective optics to couple signals dispersed along the focal line 188 with the fibers 176a–176e, inner ends 192a–192e of the fibers 176a–176e are cut at an angle and covered with a reflective coating for performing a similar function.

The inner ends 192a–192e, which are preferably polished to enhance reflectivity, can be individually oriented and shaped similar to the reflective surfaces of FIGS. 1–4 for improving coupling efficiency. Instead of using a reflective coating, the inner ends 192a–192e can be exposed to a medium (preferably air) having a much lower refractive index for supporting total internal reflection.

Different wavelength signals propagating along an optical axis 194 of the lens 174 toward individual focal points along the focal line 188 are reflected by the inner ends 192a–192e directly into the input/output optical fibers 176a–176e. The angular alignment of the inner ends 192a–192e reduces the amount of dispersion required between different wavelength signals along the focal line 188. Since the focal line 188 extends substantially perpendicular to the optical axis 194, dimensions of the device 170 perpendicular to the optical axis 194 are most effected by this change.

Although the invention has been illustrated in embodiments involving only demultiplexers, other optical designs could also benefit from my invention. For example, my invention is useful for improving couplings to spectrographs and wavelength dispersion compensation devices requiring the couplings to transmit continuous portions of the spectrum. Also, various features of the different embodiments can be substituted or combined with one another. For example, the optical fibers with beveled ends can be inserted into cavities within planar waveguides.

I claim:

1. An optical device for routing a plurality of different wavelengths comprising:
   a waveguide for propagating the different wavelengths within a plane;
   a wavelength separator that directs the different wavelengths through separate foci along a focal line that lies within said plane;
   a plurality of reflective surface portions that fold the wavelengths out of said plane and into alignment with an array of input/outputs; and
   at least some of said reflective surface portions being offset from said focal line within said plane so that said input/outputs can be spaced closer together in a dimension along the focal line.

2. The device of claim 1 in which said reflective surface portions are located along a centerline that intersects said focal line at an angle.

3. The device of claim 2 in which the input/outputs are positioned closer together by a factor of the cosine of the angle between the centerline and the focal line.

4. The device of claim 2 in which said reflective surface portions are inclined collectively to said plane through a common angle and are inclined individually to said centerline by varying angles.

5. The device of claim 1 in which said reflective surface portions are curved to refocus the different wavelengths for better matching desired mode field dimensions of the input/outputs.

6. The device of claim 1 in which said waveguide is a planar waveguide having a core layer surrounded by layers of cladding.

7. The device of claim 6 in which at least one cavity is formed through said core layer of the waveguide for mounting said reflective surface portions.

8. The device of claim 7 in which said cavity includes first and second surfaces facing the direction of wavelength propagation through the planar waveguide.

9. The device of claim 8 in which said first and second surfaces are oriented through a common angle with respect to said plane.

10. The device of claim 9 in which said first surface is a boundary surface, and the wavelengths are folded out of the plane by internal reflection from said first surface.

11. The device of claim 9 in which said second surface includes a reflective coating for folding the wavelengths out of the plane.

12. The device of claim 11 in which said cavity is filled with an index-matching material for preventing internal reflections from said first surface.

13. The device of claim 7 in which said reflective surface portions are formed by an continuous fiber mounted in said cavity and having a flat side surface for reflecting the wavelengths out of the plane.

14. The device of claim 13 in which said continuous fiber has a triangular cross section.

15. The device of claim 7 in which said cavity contains a reflective grating that functions as at least one of said reflective surface portions for folding the wavelengths out of the plane.

16. The device of claim 15 in which said reflective grating is a volume grating having a plurality of layers that vary in refractive index for producing a series of partial reflections.

17. The device of claim 16 in which said layers are oriented at a common angle to said plane.

18. The device of claim 15 in which said reflective grating also functions as a filter for reflecting a limited band of wavelengths.

19. The device of claim 7 in which said cavity is filled with a first material that is fashioned into a slope and covered with a second material for enhancing reflectivity.

20. The device of claim 19 in which said first material is different from materials used to form said layers of core and cladding.

21. The device of claim 20 in which said first material is an organic material susceptible to photoablation by ultraviolet irradiation.

22. The device of claim 20 in which said first material is a photosensitive material that is selectively removable by development.

23. The device of claim 1 in which said input/outputs are optical fibers having inner ends aligned with said plurality of reflective surfaces.

24. The device of claim 23 in which said inner ends of the optical fibers incorporate focusing optics for improving coupling efficiency between said fibers and said reflective surfaces.

25. The device of claim 24 in which said focusing optics are fiber GRIN lenses.

26. The device of claim 24 in which said focusing optics are microlenses.

27. An optical device having an optical axis with respect to which a plurality of wavelengths are separated comprising:
    a wavelength separator that spatially distinguishes the different wavelengths from the optical axis in a plane of propagation;
    an array of input/outputs extending out of said plane of propagation;
    a reflector array that folds the different wavelengths into alignment with said array of input/outputs; and
    said reflector array including individual reflectors that are offset from a line perpendicular to the optical axis within said plane of propagation so that said input/outputs can be spaced closer together in a dimension perpendicular to the optical axis.

28. The device of claim 27 in which said input/outputs are optical fibers.

29. The device of claim 28 in which said reflector array is formed by inclined ends of said optical fibers.

30. The device of claim 29 in which said inclined ends have a reflective surface for folding the different wavelengths between said plane of propagation and another plane containing said optical fibers.

31. The device of claim 30 in which said inclined ends are mounted in a common optical support.

32. The device of claim 27 in which said input/outputs are arranged along a single straight line that is inclined in said plane of propagation to said line that is perpendicular to the optical axis.

33. The device of claim 32 in which said input/output array is mounted in a common optical support.

34. The device of claim 33 including a planar waveguide for guiding the wavelengths along said plane of propagation.

35. The device of claim 34 in which said planar waveguide includes top and bottom surfaces, and said common optical support is attached to said top surface of the planar waveguide.

36. The device of claim 27 in which said reflector array is arranged for conveying wavelengths throughout a continuous spectrum to said input/output array.

37. The device of claim 36 in which said input/outputs are positioned close enough together in the dimension perpendicular to the optical axis for conveying the continuous spectrum.

38. The device of claim 37 in which said optical device is a dispersion compensator.

39. The device of claim 27 in which said individual reflectors of the reflector array are formed by different portions of a continuous reflective surface.

40. The device of claim 39 in which said continuous reflective surface is formed by an optical fiber having a flat surface for reflecting light.

41. The device of claim 27 in which said reflector array is formed by at least one reflective grating.

42. The device of claim 41 in which said reflective grating is a volume grating composed of alternating layers of materials having differing refractive indices.

43. The device of claim 27 in which said reflector array is formed in a waveguide by at least one boundary surface that provides total internal reflection of the wavelengths between said plane of propagation and said array of input/outputs.

44. The device of claim 43 in which said boundary surface is formed by an undercut surface of a cavity formed in the waveguide.

45. The device of claim 27 in which said reflector array is formed in at least one cavity of a waveguide having opposing surfaces commonly inclined at an approximately 45 degree angle to said plane of propagation.

46. The device of claim 45 in which one of said opposing surfaces is covered with a reflective material, and a remaining portion of said cavity is filled with an index-matching material.

47. The device of claim 27 in which said reflector array is formed in at least one cavity of a waveguide, and said cavity is partially filled with a material that is different from that of the surrounding waveguide.

48. The device of claim 47 in which said material is an organic material susceptible to photoablation by ultraviolet irradiation.

49. The device of claim 47 in which said material is a photosensitive material that is selectively removable by development.

50. A method of making an optical coupling in a planar waveguide having a mechanism for spatially distinguishing different wavelengths along a focal line comprising the steps of:
    relatively orienting the planar waveguide with respect to a directed beam so that the directed beam is inclined at a non-normal angle of incidence to a surface of the planar waveguide;
    removing a volume of material from the planar waveguide exposing a core layer of the planar waveguide;
    forming inclined surface portions through the core layer of the planar waveguide in alignment with the directed beam;
    mounting an array of input/outputs on the surface of the planar waveguide so that wavelengths propagating in the core layer of the planar waveguide and reflected by the inclined surface portions are coupled to the input/outputs of the array; and
    orienting at least some of said reflective surface portions offset from said focal line within said plane so that said input/outputs can be spaced closer together in a dimension along the focal line.

51. The method of claim 50 in which said step of removing includes etching a plurality of cavities having opposing side walls commonly inclined at the non-normal angle of incidence.

52. The method of claim 51 in which the inclined surface portions are formed by one of the opposing side walls inclined at the non-normal angle of incidence.

53. The method of claim 52 including the further step of applying a mask to the surface of the planar waveguide, leaving openings for exposing a plurality of areas on the surface of the planar waveguide.

54. The method of claim 53 in which said step of removing includes directing a beam of plasma at the non-normal angle of incidence to the surface of the planar waveguide.

55. The method of claim 52 in which one of the opposing side walls undercuts the surface of the planar waveguide and forms the inclined surface portions.

56. The method of claim 52 including the further steps of:

applying a reflective coating on one of the opposing side walls for forming the inclined surface portions, and filling the cavities with a material matched in refractive index to the core layer for avoiding internal reflections from the other of the opposing side walls.

57. The method of claim 50 in which said step of removing includes etching a plurality of cavities prior to said step of relatively orienting the planar waveguide.

58. The method of claim 57 including the further step of filling the cavities with an organic material.

59. The method of claim 58 in which the directed beam is composed of ultraviolet light, and said step of forming inclined surface portions includes using the directed beam to remove a portion of the organic material.

60. The method of claim 57 including the further step of filling the cavities with a photosensitive material.

61. The method of claim 60 in which said step of forming inclined surface portions includes using the directed beam to develop a portion of the photosensitive material and subsequently removing the developed portion.

62. A method of forming an out-of-plane mirror within a planar waveguide comprising the steps of:

applying a mask to a surface of the planar waveguide, leaving openings for exposing a plurality of areas on the surface of the planar waveguide;

relatively orienting the planar waveguide with respect to a directed beam of plasma so that the directed beam is inclined at a non-normal angle of incidence to the exposed surface of the planar waveguide;

using the directed beam to etch a cavity in the planar waveguide having opposing side walls commonly inclined at the non-normal angle of incidence; and orienting at least one of said opposing side walls to support total internal reflection of light propagating in the planar waveguide.

63. The method of claim 62 in which one of said opposing side walls forms the out-of-plane mirror.

64. The method of claim 63 in which one of the opposing side walls undercuts the surface of the planar waveguide and forms the out-of-plane mirror.

65. The method of claim 63 including the further step of applying a reflective coating on one of the opposing side walls for forming the out-of-plane mirror.

66. The method of claim 65 including the further step of filling the cavity with a material matched in refractive index to a core layer of the planar waveguide for avoiding internal reflections from the other of the opposing side walls.

* * * * *